Nov. 9, 1937.                M. MALLORY                2,098,875
                      INTERNAL COMBUSTION ENGINE
                         Filed May 29, 1936
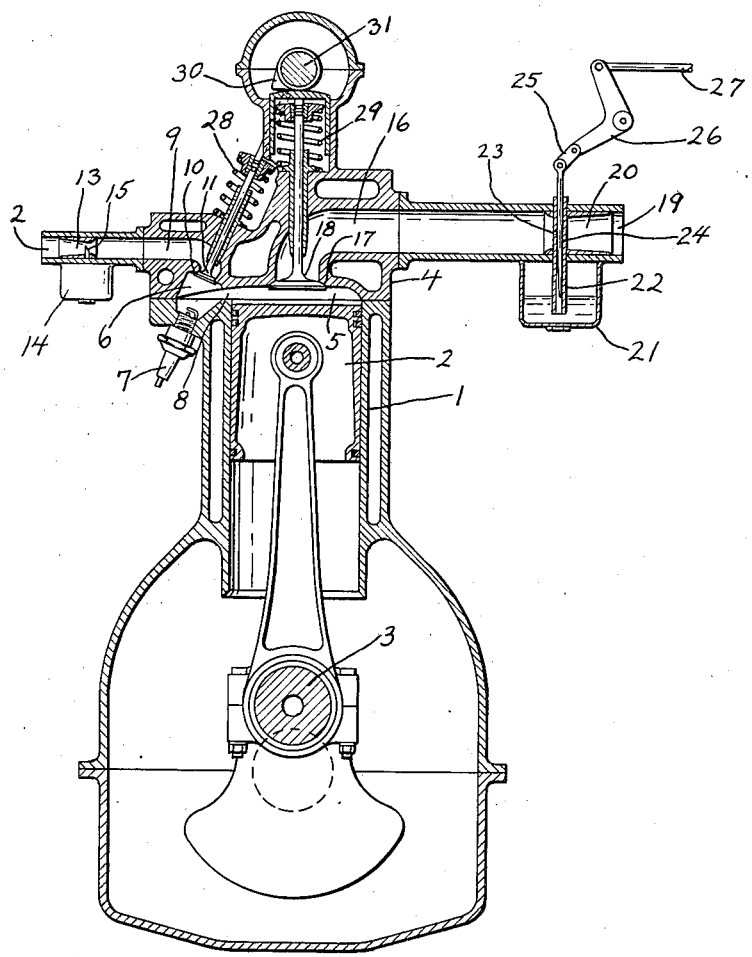
Inventor
Marion Mallory
E. N. Lovewell
By
Attorney Patented Nov. 9, 1937

2,098,875

UNITED STATES PATENT OFFICE 2,098,875

INTERNAL COMBUSTION ENGINE

Marion Mallory, Detroit, Mich.

Application May 29, 1936, Serial No. 82,588

6 Claims. (Cl. 123—75)

This invention relates to internal combustion engines and more especially to that class of engines in which the fuel charge is drawn in by the piston and fired by electric ignition.

The object of the invention is to provide an engine of improved construction which operates with substantially the same compression and charging pressures under both full and light load conditions, the charging or cylinder pressures being higher at idling than at high speed and varying only with the speed of the engine.

A further object is to provide an engine having a fixed charge of explosive mixture for idling, which varies only with engine speed and serves the purpose of a pilot lighter or igniter and to provide a fixed secondary charge of air, charged with gasolene, oil or the like, in proportion to the power demand.

A still further object is to prevent the primary charge from completely mixing or exhausting into the secondary charge during the suction stroke of the engine.

It is a well known fact that, in automobile engines as at present constructed, when the throttle is partly closed, the compression is correspondingly reduced, thus lowering the efficiency. Under average running conditions, the throttle is seldom opened to its full extent. It is obvious, therefore, that if full compression can be had under all conditions of operation, a much greater mileage will be obtained from the fuel consumed.

I am aware that other inventors have attempted to provide engines that would operate satisfactorily with constant compression under all loads by supplying a primary combustion chamber, having a spark plug, with a mixture of proper proportions for ignition, while the secondary or main compression chamber was supplied with a constant flow of air and a varying charge of fuel to meet the power demand. The operation of such engines under part throttle and especially light loads has been unsatisfactory due to the mixture in the primary combustion chamber becoming too lean around the spark plug to ignite. The leanness of mixture was caused by the control of the charge supplied to the primary combustion chamber. For example, if the resistance between the carburetor and the primary combustion chamber was greater than the resistance between the primary combustion chamber and the secondary combustion chamber, the vacuum in both combustion chambers would be equal and, when operating under a light load with air or a very lean mixture being supplied to the large combustion chamber, the vacuum being the same in both chambers would cause the mixture in the primary combustion chamber to completely mix with the air or leaner mixture in the secondary combustion chamber, making it too lean to ignite. Throttle valves used by other inventors between the carburetor and the primary combustion chamber would cause a proportionate increase in vacuum in both combustion chambers when the throttle was moved from an open position toward a closed position. This would cause the mixtures of the two chambers to commingle with each other more under light loads than under full loads, which is opposite to the result desired. Either air valves, throttle valves or a restriction between the primary carburetor and the primary combustion chamber to control the charge would cause the vacuum to be equal, or to vary in both primary and secondary combustion chambers, resulting in ignition failure and lack of flexibility.

My invention differs fundamentally from previous constructions. I use a small carburetor with no valve for supplying to a small combustion chamber, having a spark gap in its lower extremity, through one inlet a charge that varies only with speed and is of proper volume and proportions for idling. The passage between the primary combustion chamber and the secondary combustion chamber is of greater restriction than the passage from the carburetor to the primary combustion chamber. The result is that the vacuum in the two combustion chambers will not vary in relationship to each other as the engine is being throttled. Furthermore, the vacuum in the primary combustion chamber will always be lower than the vacuum in the secondary combustion chamber, preventing the mixture in the primary combustion chamber from completely mixing with the air or lean mixture in the larger combustion chamber. The primary carburetor supplies a charge that varies only with speed and is of proper proportions for idling, while a larger charge, which varies in volume only with the speed, is supplied to the cylinder through another inlet. The mixture ratio is varied to control the power of the engine. This is accomplished by the use of a metering pin connected to the throttle rod. By this method, there is no increase in vacuum within the cylinder or small combustion chamber when the engine is being throttled, nor will the vacuum in the small chamber ever be as high as the vacuum in the large combustion chamber. Consequently, the mixture in the small combustion chamber will remain uniform under all load conditions. This, in addition to the location of the spark gap where the heavy ends of the mixture will always fall downwardly into the gap, insures ignition at all times.

The construction of the invention, in its preferred form, will be more particularly described in connection with the accompanying drawing, which is a vertical sectional view taken centrally of one of the engine cylinders, the intake manifold and carburetors.

The drawing shows one of the engine cylinders 1 in which a piston 2 is reciprocable, being driven in the usual manner from the crank shaft 3. The head 4 of the cylinder is formed with a combustion chamber 5. A small combustion chamber 6, having a spark gap in its lower extremity therein, is formed at one side of the chamber 5 and is in constant communication therewith through a restricted opening 8.

Fuel mixture is supplied to the chamber 6 from an intake manifold 9 through an inlet port 10, which is controlled by a valve 11. An air inlet 12 leads through a venturi 13 to the manifold 9 and a small carburetor 14 supplies fuel thereto through a jet opening 15 located in the venturi 13. It will be noted that there is no valve in the carburetor 14. It is initially adjusted to supply the proper amount of fuel for idling and the volume of the charge cannot be changed by the operator because it has no valve.

A charge of constant volume is supplied to the chamber 5 from an intake manifold 16 through an inlet port 17 which is controlled by a valve 18. An air inlet 19 leads through a venturi 20 which controls the volume of air through manifold 16. A carburetor 21 is located beneath the venturi 20 and has an outlet tube 22 with an opening 23 into the venturi. The fuel supplied through the opening 23 into the air stream is metered by a tapered pin 24, which is slidable in the tube 22 and is connected by a link 25 and bell crank 26 to the throttle rod 27.

The valves 11 and 18 are normally held closed by their respective springs 28 and 29, but are opened substantially simultaneously by a cam 30 on the cam shaft 31. It is deemed unnecessary to show the exhaust port and valve in this application, since they may be of the usual construction and do not constitute a part of this invention.

In the operation of the invention, the engine always draws in a uniform idling charge through the port 10 and a uniform volume of air or mixture through the port 17. The port 17 admits only air when the engine is idling but, if an increase in speed or power is desired, the metering pin 24 is moved upwardly. The air passing through the port 17 then becomes mixed with fuel and this charge becomes richer as the metering pin is lifted.

It will therefore be apparent that in this engine the compression will not vary as a result of throttle variation, because operation of the throttle does not increase or decrease the flow of air into the engine. Unlike other engines, this engine is throttled entirely by injecting oil, gasolene or the like into the secondary combustion chamber. The primary combustion chamber plays the role of a pilot lighter, which is not throttled as in other engines. Its charge can only be increased by increased speed of the engine, which is accomplished by adding more combustible fuel to the secondary combustion chamber, and the power of the engine is increased by merely adding fuel to the large air stream through the venturi 20 and metering fuel into the air stream by lowering or raising the metering pin 23 in proportion to the power demand. The vacuum will be low when the engine is idling, instead of high, as in other engines. There is just enough vacuum to draw a charge through the carburetor 14 for idling. Since the air restriction through either carburetor is never varied and the restriction 8 is greater than the restriction between the carburetor and combustion chamber 6, the vacuum will always be lower in the small combustion chamber than in the large combustion chamber, and increases only with speed, never by closing the throttle as in other engines.

For this reason, the mixture in the combustion chamber 6 will remain uniform or in a combustible state, and the heavy ends will fall in the immediate vicinity of the spark gap.

As a result of this construction, therefore, a small combustible charge is drawn from one side of the engine and will remain in a combustible state, while a charge of air or mixture is drawn from the other side. It is impossible to effect any restriction in either carburetor which will cause any variation in suction on either side.

While I have shown and described in detail the preferred embodiment of the invention, it will be understood that this is merely for the purpose of illustration and that the invention also embraces all such modifications as may be made within the scope of the appended claims.

Having thus described the invention, what I claim as new and desire to secure by Letters Patent, is:—

1. In an internal combustion engine, a cylinder, a primary combustion chamber having a spark gap located in its lower extremity, a small carburetor communicating with the primary combustion chamber, a secondary combustion chamber with a carburetor connected thereto, said primary combustion chamber and secondary combustion chamber being in constant communication with each other by a port having a higher restriction than the passageway through the small carburetor which communicates with the primary combustion chamber, said small carburetor including means for supplying the primary combustion chamber with a fixed combustible charge that varies only with engine speed, the other carburetor including means for supplying the secondary combustion chamber with a charge of air that varies in volume only with engine speed, means for admitting fuel to the charge of air in proportion to power demand, and valve means for admitting the charge to the primary combustion chamber and secondary combustion chamber simultaneously.

2. In an internal combustion engine, a cylinder having an intake port, a firing chamber in fixed communication with said cylinder and having a separate intake port, valveless air passageways leading to the respective ports, a carburetor supplying a fixed charge of fuel suitable for idling to one of said passageways, a second carburetor with a fuel jet tube having an opening into the other passageway, a metering pin movable to close said opening or to selectively open it, valves for the respective intake ports, and mechanical means for simultaneously opening said valves in proportion to the spaces to be filled from the respective ports, so that there will be substantially no commingling of the charges entering from the respective passageways.

3. In an internal combustion engine, a cylinder, a combustion chamber having two intake ports, means to supply a fixed idling charge to one of said ports, means to supply a fixed air charge to the other of said ports, mechanically operated means to open said ports, and means for introducing fuel into the air port to increase the power output of the engine while the volume of the charge remains substantially constant.

4. In an internal combustion engine, a cylinder, a combustion chamber having two intake ports with air flow capacities which are fixed and of low restriction, means for supplying one of said ports with fuel for low speed and idling, mechanically operated means to open said ports, and variable means for supplying the other of said ports with fuel to increase engine speed and thereby increase suction through both of said ports.

5. In an internal combustion engine, a primary combustion chamber, a secondary combustion chamber, means for supplying an explosive mixture to the primary combustion chamber, means for supplying a charge to the secondary combustion chamber, and means for maintaining less vacuum in the primary combustion chamber than in the secondary combustion chamber at all times, regardless of speed or load conditions.

6. In an internal combustion engine, a primary combustion chamber, a secondary combustion chamber, means for supplying an explosive mixture to the primary combustion chamber of fixed volume and proportions, means for supplying to the secondary combustion chamber a charge of fixed volume and variable proportions, and means for maintaining less vacuum in the primary combustion chamber than in the secondary combustion chamber at all times, regardless of speed or load conditions.

MARION MALLORY.